Aug. 21, 1945.                G. A. WAHLMARK                2,383,429
              HYDRAULICALLY OPERATED CONTROL MECHANISM
                    Filed Nov. 16, 1942        2 Sheets-Sheet 1
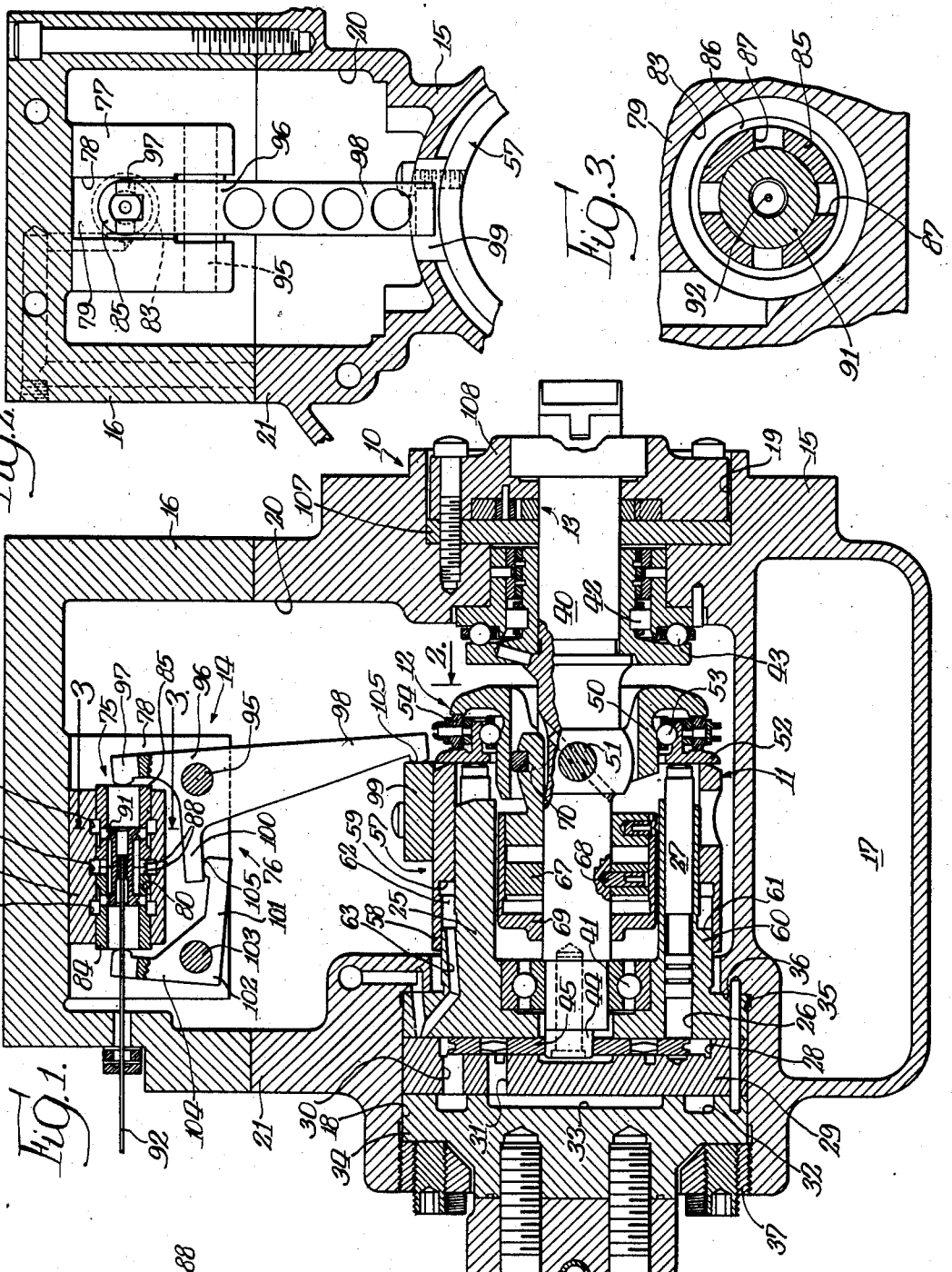
INVENTOR.
Gunnar A. Wahlmark
BY
his Atty.

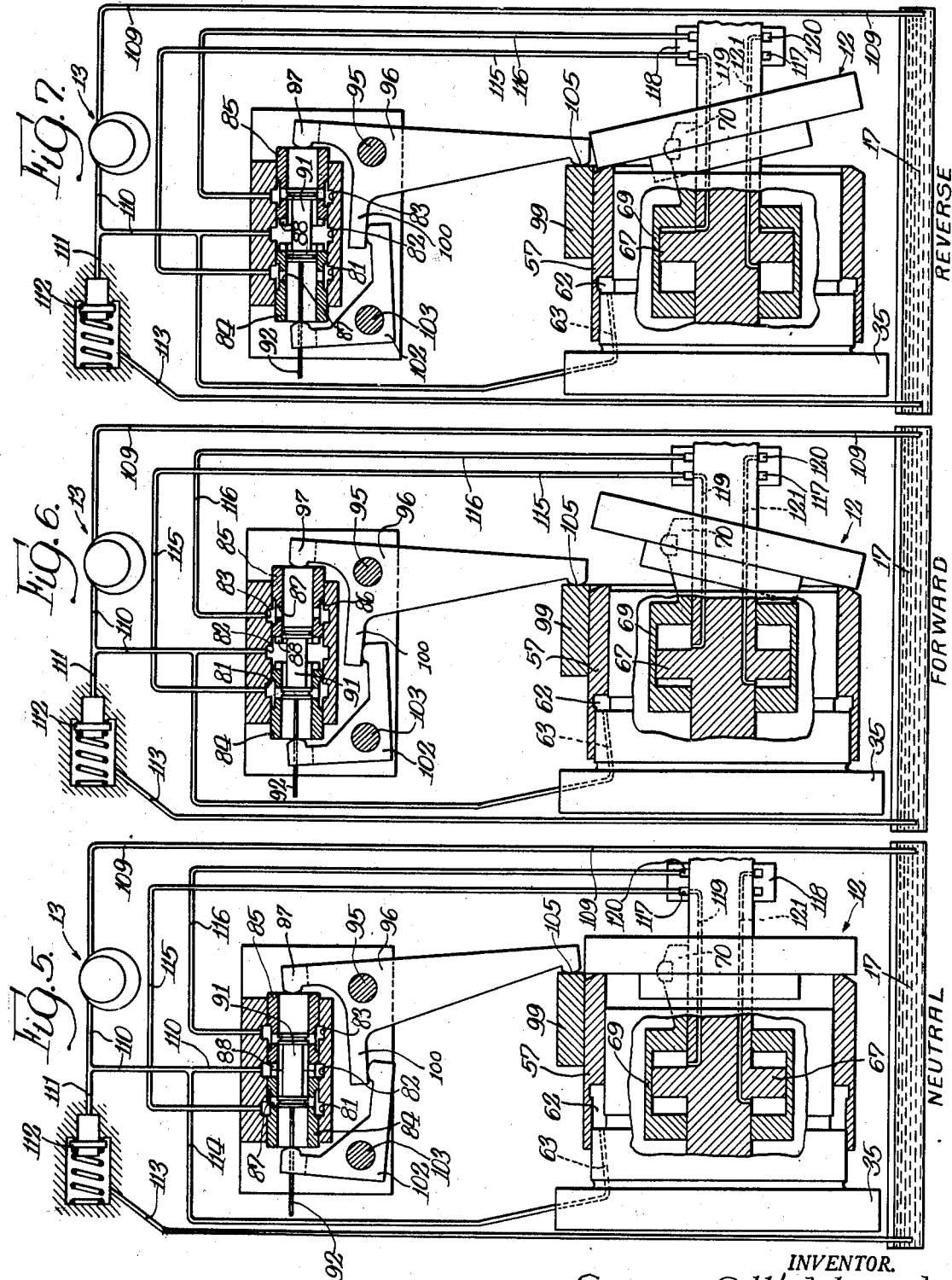

Patented Aug. 21, 1945

2,383,429

UNITED STATES PATENT OFFICE 2,383,429

HYDRAULICALLY OPERATED CONTROL MECHANISM

Gunnar A. Wahlmark, Rockford, Ill., assignor to Sundstrand Machine Tool Co., Rockford, Ill., a corporation of Illinois Application November 16, 1942, Serial No. 465,736

15 Claims. (Cl. 121—41)

The invention relates generally to a hydraulically operated control mechanism and more particularly to such a control mechanism of the reversible servo type, it being the general object of the invention to provide a new and improved mechanism of this type.

A more particular object of the invention is to provide a hydraulically operated reversing control mechanism which produces extremely accurate reversal and which requires a relatively light force to effect its operation.

Another object is to provide a hydraulically operated reversing control mechanism in which pulsation and overrun are eliminated.

A further object is to provide an extremely sensitive control mechanism of the reversible servo type.

Still a further object is to provide a control mechanism of the reversible servo type having a member associated with the element to be reversed which has a movement common as to direction and proportional to the extent of movement of the element in either direction away from neutral, means predetermining the direction and extent of movement of the element, and means governed by the member arresting movement of the element when it has moved the predetermined amount.

Other objects and advantages will become apparent from the following detailed description, taken in connection with the accompanying drawings, in which:

Fig. 1 is a longitudinal vertical sectional view of a structure embodying the features of this invention.

Fig. 2 is a transverse sectional view taken approximately along the line 2—2 of Fig. 1.

Fig. 3 is a transverse sectional view of a valve element only taken along the line 3—3 of Fig. 1.

Fig. 4 is a longitudinal sectional view of a valve element only.

Fig. 5 is a diagrammatic view of the hydraulic circuit with the parts shown with the reversible element to be controlled in neutral position.

Fig. 6 is a diagrammatic view of the hydraulic circuit with the parts shown with the reversible element to be controlled in forward position.

Fig. 7 is a diagrammatic view of the hydraulic circuit with the parts shown with the reversible element to be controlled in reverse position.

While the invention is susceptible of various modifications and alternative constructions, it is shown in the drawings and will hereinafter be described in a preferred embodiment. It is not intended however that the invention is to be limited thereby to the specific construction disclosed. On the contrary it is intended to cover all modifications and alternative constructions falling within the spirit and scope of the invention as defined in the appended claims.

For purposes of disclosure the invention is here shown and will hereinafter be described as embodied in or employed in conjunction with a fluid pressure device, that is, pump or motor, of the wobbler type, it being understood, of course, that the invention has many other applications. As here shown the invention is embodied in a unitary structure comprising generally an elongated casing 10, a fluid pressure operated or generating device 11 having an element 12 to be controlled, a control pressure generating device 13 and the control mechanism, generally designated 14. The casing 10 is composed of a first, main and lower portion 15 and of a second upper and closure-like portion 16. The main casing portion 15 provides a tank or reservoir 17 for the control fluid and a housing for the fluid pressure operated or generating device 11 and for the control pressure generating device 13. To that end the main casing portion 15 has opening through one end wall a large diameter bore 18 and through the other end wall a stepped bore 19, while opening through the top is a large, generally rectangular opening 20 bounded by an upstanding flange 21.

The fluid pressure operated or generating device 11 is generally of the type disclosed and claimed in my Patent No. 2,280,875, dated April 28, 1942, and comprises briefly an annular cylinder block 25 having formed therein a plurality of longitudinally extending cylinders 26 arranged in an annular series. Reciprocable in each cylinder is a piston 27 so proportioned as to project at all times from one end, herein the right hand end, of the cylinder block. Each cylinder 26 in turn opens through the opposite end of the cylinder block to a chamber 28 formed in the adjacent face of a plate 29 having a passage 30 communicating with the chamber 28 near the periphery thereof, and a passage 31 communicating with the chamber 28 radially inwardly of the point of communication of the passage 30 therewith. The passages 30 and 31 in turn communicate, respectively, with an annular passage 32 and a central recess 33 formed in the adjacent face of a member 34. The annular passage 32 and the recess 33 in turn communicate with external ports, not shown, functioning alternatively as outlet or inlet ports, depending upon the direction of operation of the device. The member 34, the plate 29, and a radially extending flange 35 on the cylinder block 25 all are received snugly in the bore 18 with the flange 35 abutting an annular shoulder 36 formed in the main casing portion 15 and the member 34 held in the bore by a large, annular nut 37 threaded into the bore.

Extending longitudinally of the main casing portion 15 and projecting from the right hand end thereof is a shaft 40 journaled near its inner end in ball bearings 41 supported by the cylinder block 25, and near its outer end in roller bearings 42, with the axial thrust on the shaft taken up by ball bearings 43. At its inner end the shaft 40 carries an eccentrically mounted roller 44 projecting into the chamber 28 and drivingly engaging a wheel-like valve 45 controlling the supply and exhaust of fluid to the cylinders 26. This wheel-like valve is more particularly disclosed and claimed in my Patent No. 2,190,812, dated February 20, 1940.

On the shaft 40 intermediate its ends is the element 12 which is to be controlled, and in the embodiment here shown for purposes of disclosure takes the form of a wobbler. This particular wobbler construction here disclosed is fully described and claimed in my application Serial No. 349,163, filed August 1, 1940, issued as Patent No. 2,337,511 on December 21, 1943. Suffice it to say, therefore, that the wobbler comprises a main and inner annular ring 50 pivotally secured in surrounding relation to the shaft by means of a pin 51 extending diametrically through the shaft and into the annular ring 50. In turn carried by the ring 50 is a second annular ring 52, rotatable relative to the ring 50, and supported radially by ball bearings 53 and against axial thrust by roller bearings 54. The ring 52 is disposed to be engaged by the pistons 27 and is of sufficient radial width to extend outwardly beyond the pistons for a purpose that will presently become more apparent.

As is well known, when the wobbler 12 assumes its neutral position, that is, perpendicular to the shaft 40, no reciprocation of the pistons 27 can take place and thus there is no rotation of the shaft 40 as the device is being operated as a motor, or no discharge of fluid if the device is being operated as a pump. When, however, the wobbler is tilted from its neutral position, reciprocation of the pistons takes place and the device is in operating condition with the speed of operation or the quantity of fluid discharged varying with the degree of tilting, and the direction of rotation or direction of fluid discharge depending upon the side of neutral to which the wobbler has been tilted. For purposes of this disclosure, the device will be assumed to be in forward when the wobbler is tilted as shown in Fig. 6, and in reverse when the wobbler is tilted as shown in Fig. 7.

It is the purpose of this invention to provide improved control mechanism, particularly hydraulically operated servo mechanism for determining the direction of operation of the device 11, as well as the rate of operation. To that end the control mechanism comprises generally a means 57 which is so associated with the element to be controlled, that is, the wobbler 12, that it has a movement proportional to the extent of tilt or shift of the wobbler away from neutral position and, moreover, this movement is in the same direction, that is, the movement of the means 57 is a common movement regardless of whether the wobbler is shifted to forward or to reverse position. Herein this means 57 takes the form of an annular sleeve slidably surrounding the cylinder block 25 at the end through which the pistons 27 project. The sleeve 57 at its left hand end, as viewed in Fig. 1, has a portion 58 of enlarged internal diameter to form an annular face or pressure surface 59. The cylinder block 25 correspondingly has a portion 60 of enlarged external diameter to form an annular face or pressure surface 61, and thus with the portion 58 form a chamber 62 of variable size. Leading to this chamber is a passage 63 through which fluid under pressure is supplied to the chamber, as will be more fully pointed out in connection with the description of the hydraulic circuit. This means or sleeve 57 bears at its right hand end against the annular ring 52 of the wobbler 12 and serves to determine the absolute zero position of the wobbler and, of course, will be shifted to the left an extent proportional to the departure of the wobbler from its neutral position, regardless of whether such departure is toward forward position or toward reverse position.

Means is provided for tilting the wobbler in either direction away from its neutral position. Herein this means is hydraulic and comprises an annular piston 67 fixed on the shaft 40 through the medium of a pin 68. Enclosing this piston and slidable longitudinally of the shaft 40 is a cylinder 69 having projecting from the right end thereof an extension or finger 70 engaging the inner annular ring 50 of the wobbler 12 in such manner as to tilt the same in either direction from neutral depending upon the direction of longitudinal shift of the cylinder 69.

Completing the control mechanism is a servo valve means, generally designated 75, and a lever system, generally designated 76, for transmitting the movement of the means 57 to certain portions of the servo valve means 75. This servo valve means, as well as the associated lever system 76, is carried by the upper closure-like portion 16 of the casing. To that end there depends downwardly a block 77 having a channel 78 around three sides so as to leave a central portion 79. Extending longitudinally of this central portion is a bore 80, and opening to the bore are three uniformly spaced grooves 81, 82 and 83. Reciprocable in the bore 80 are two sleeve valves 84 and 85. Each of these valves is formed intermediate its ends with an annular recess 86 communicating with the interior of the sleeve valve through a plurality of radial ports or apertures 87. Each of the annular recesses 86 is of such width and such location that communication is maintained with the grooves 81 and 83 by the valves 84 and 85, respectively, in all positions thereof. At its inner end each sleeve valve is formed with a plurality of notches 88 (see Fig. 4) so as to provide communication from the exterior to the interior of the valves even when the adjacent ends of the valve are in abutment. Each valve is at this inner end also formed with a semi-recess 89.

Slidable within the sleeve valves is a spool valve 91 having a land at each end, each equal in width to the diameter of the opening or ports 87 and so spaced axially as to register with and close the ports 87 in both the sleeve valves 84 and 85 when the sleeve valves are abutting. Secured to the spool valve is a rod 92 extending outwardly through the casing portion 16 for manual or other actuation of the spool valve 91.

Pivoted on a pin 95 in the channel 78 near the right hand end of the block 77 is a lever 96 having an upper arm 97 that is bifurcated (see Fig. 2) so as to bear against diametrically opposed points of the sleeve valve 85, and a lower arm 98 disposed to bear against a block 99 secured on the sleeve 57. Extending inwardly, that is, to the left as viewed in Fig. 1, at right angles to the arms 97 and 98 is a finger 100 engaging the top of a generally similar finger or arm 101 of a crank 102 pivoted on a pin 103 in the channel 78 near the left hand end of the block 77. Extending at right angles to the arm 101 is an arm 104 which, like the arm 97, is bifurcated at its end to engage at diametrically opposite points the sleeve valve 84. The bifurcated ends of the arms 97 and 104 and the ends of the arms 98 and 101 on the side contacting, respectively, the block 99 and the finger 100, are preferably formed with rounded humps 105 to assure proper engagement in the various angular positions of the arm 96 and the crank 102. It will be apparent from the above that, with this lever system, as the sleeve 57 moves to the right the lever 96 and the crank 102 will be pivoted in opposite directions, thereby forcing the sleeve valves 84 and 85 toward one another, while when the sleeve 57 moves to the left the lever 96 and the crank 102 will be so pivoted as to permit separation of the sleeve valves. The parts are, of course, so proportioned and so positioned that when the sleeve 57 holds the wobbler in absolute neutral the adjacent ends of the sleeve valves will be in abutment, as shown in Figs. 1 and 5.

Having described the mechanical construction, the hydraulic circuit and the operation of the invention will now be described. Control fluid for operating the various hydraulic devices is supplied by the control pressure generating device 13, which herein is shown as a pump of the rotary element type and may be of any well known construction. To obtain a compact and unitary structure, the pump 13 is encased in a housing formed by a pair of members 107 and 108 secured in the bore 19 with the pump driven from the shaft 40. Fluid is drawn into the pump from the reservoir 17 through an intake conduit 109 and discharged from the pump to a conduit 110 which leads to and communicates with the intermediate one of the grooves 82 in the portion 79 of the block forming the valve casing. Branching from the conduit 110 is a conduit 111 leading to a relief valve 112 adapted to maintain a pressure of approximately one hundred and fifty pounds in the conduit 110. Any fluid by-passed by the relief valve 112 is returned to the reservoir 17 through a conduit 113.

Also branching from the conduit 110 is a conduit 114 which communicates with the passage 63 to supply fluid to the chamber 62 formed by the sleeve 57 and the cylinder block 25. It will be seen that the supply of fluid to the chamber 62 is constant and at constant pressure. The sleeve 57 thus serves merely to bias the wobbler 12 to neutral position, and while here shown as hydraulic this biasing function might well be effected by some other means. The force exerted by the sleeve on the wobbler 12 is sufficient to overcome the inherent tendency of the wobbler due to the reaction of the pistons 27 thereon to assume its maximum tilted position.

Completing the hydraulic circuit are a pair of conduits 115 and 116 leading from the servo valve means to the cylinder 69. Conduit 115 is connected to communicate at one end with the groove 81 and at the other end communicates with a groove 117 formed in a stationary portion 118 of the casing in immediately surrounding relationship to the shaft 40. This groove 117 in turn communicates with a passage 119 extending longitudinally of the shaft 40 and opening outwardly of the shaft just to the right of the piston 67. Conduit 116 is connected to communicate at one end with the groove 83 and at the other end communicates with a groove 120 formed in the casing portion 118. Communicating with this groove 120 is a passage 121 in the shaft 40 opening outwardly of the shaft just to the left of piston 67. It is well to point out at this time that the force obtainable by the supply of control fluid to the cylinder 69 is sufficiently in excess of the force of the sleeve 57 so as to permit the cylinder 69 to overcome the sleeve.

Let it be assumed that the parts are in neutral position, as shown in Figs. 1 and 5. If now the rod 92 is actuated to shift the spool valve 91 a predetermined distance to the left, for example, to the position shown in Fig. 6, the device 11 will be caused to operate forward and at a rate proportional to the extent of shift of the spool valve 91. This shift of the spool valve will initially uncover the radial ports 87 in the sleeve valve 84 and will connect such ports to the supply groove 82. As a result, control fluid under pressure flows from the groove 82 through the notches 88, ports 87, annular recess 86, groove 81, conduit 115 and passage 119 to the right side of the cylinder 69. Simultaneously the radial ports 87 will be uncovered, thereby opening the ports and the groove 83, communicating therewith through the annular recess 86, with the interior of the sleeve valve 85 which is equivalent to a connection to tank, for any fluid discharged through the end of the valve finds its way over the device 11 and eventually into the reservoir 17. Thus, as the supply of control fluid under pressure to the right end of the cylinder 69 urges the cylinder to the right and tilts the wobbler 12 toward the position shown in Fig. 6, fluid in the left hand end of the cylinder 69 flows out through the passage 121, the conduit 116, groove 83, recess 86, and ports 87 to the tank, as described.

The cylinder 69 thus supplied with pressure fluid at one end, aided by the reaction of the pistons on the wobbler 12, overcomes the sleeve 57 which is then forced to the left as the wobbler is tilted from its neutral position to that shown in Fig. 6. With this movement of the sleeve 57 to the left, the lever 96 is free to pivot in a clockwise direction and is so caused to pivot, that is, is caused to follow the sleeve 57 by the reaction of the sleeve valves 84 and 85. Inasmuch as the adjacent ends of the valves are constantly subjected to control fluid under pressure, there is an ever present tendency for the valves to separate and thus to pivot the lever 96 in a clockwise direction and the crank 102 in a counterclockwise direction. Moreover, the lever and the crank being interengaged as they are, both sleeve valves will move equal distances from their neutral or abutting position. As the sleeve valve 84 is shifted to the left, the ports 87 will again register with the land and be completely blocked by the land of the spool valve when the wobbler has been shifted or tilted the desired amount, as predetermined by the shift of the spool valve. With the ports 87 now again cut off from the supply groove 82, no further fluid is supplied to the right hand end of the cylinder 69, and hence no further shift of the cylinder and no further tilt of the wobbler 12 takes place, but the fluid is trapped in the right hand end of the cylinder to maintain the wobbler in its desired position of adjustment.

It is to be noted that while shift of the sleeve valve 84 causes a reblocking of the ports 87, corresponding shift of the sleeve valve 85 does not result in a blocking of the ports 87 of the valve 85, but on the contrary these ports remain open to tank. In fact, it is to be noted that opening of the ports 87 in the valve 85 is twice as great as the opening of the ports 87 in the valve 84. This is particularly true for small shifts of the spool valve. Thus, for example, if the spool valve were to be shifted from neutral toward forward position, that is, to the left in Fig. 6, one thousandth of an inch, the relative movement between the spool valve and the sleeve 85 would be two thousandths of an inch because the sleeve valve 85 moves a distance to the right equal to the distance that the spool valve moves to the left. This permits ready emptying of the left side of the cylinder 69 and prevents the building up of any back pressure therein. This also prevents the setting up of pulsations. Overrun is prevented by the divided, separate sleeve valves and by the fact that the lands on the spool valve are equal in width to the diameter of the ports 87. Thus should there be any attempt at an overrun, the sleeve 84 would, of course, carry the ports 87 beyond the land of the spool valve and thus immediately connect the right hand end of the cylinder 69 to tank.

If the spool valve 91 had been shifted to reverse, that is, toward the right, as viewed in the figures, instead of to the left, the wobbler 12 would have been tilted to the position shown in Fig. 7. Under these circumstances the ports 87 in the sleeve valve 85 would through the medium of the spool valve have been connected to the supply groove 82 and thus control fluid under pressure would have been supplied to the left hand end of the cylinder 69, while the right hand end would have been connected to tank through the sleeve valve 84. As the cylinder 69 tilted the wobbler 12 and hence again caused a shift of the sleeve 57 to the left, the sleeve valves 84 and 85 would have separated, resulting in a closure of the ports 87 of the valve 85 after the wobbler had been tilted the desired amount.

From either forward or reverse position, the wobbler 12 is returned to its neutral position by restoring the spool valve 91 to its neutral position. Such shift of the spool valve to its neutral position will uncover the radial ports 87 in both the sleeve valves 84 and 85, and, moreover, will uncover them in such manner that both are connected to tank. Thus both sides of the cylinder 69 will be connected to tank and relieved of pressure with the result that the means 57 is effective to restore the wobbler to its neutral or absolute zero position. In such restoration of the wobbler to zero or neutral position, the sleeve 57 will move to the right regardless of whether the wobbler has been tilted to forward or reverse operation of the fluid pressure device. As a consequence, the sleeve 57 through the block 99 will swing the lever 96 in a counterclockwise direction and this lever will in turn swing the crank 102 in a clockwise direction so that the bifurcated arms of the lever and the crank will act to shift the sleeve valves 84 and 85 into abutment with one another. Upon reaching abutted position, the ports 87 in the sleeve valves 84 and 85 will again be closed by the lands on the spool valve 91, and the mechanism will be back in the neutral position shown in Figs. 1 and 5.

I claim as my invention:

1. A control mechanism comprising, in combination, a shiftable element having a neutral position, means biasing said element to neutral position, fluid pressure operated means operable to shift said element varying amounts to either side of neutral against said biasing means, and reversing servo means for governing the shift of said element by said fluid pressure means comprising valve means including a common valve element shiftable in a direction and to an extent indicative of the desired shift of said element and a pair of separate shiftable valve elements each cooperating with said common valve element to control the supply or exhaust of fluid to or from said fluid pressure means, and means associated with said shiftable element to govern the positions of said pair of valve elements in accordance with the position of said shiftable element.

2. A control mechanism comprising, in combination, a shiftable element, means biasing said element to neutral position, a double acting piston and cylinder device operable to shift said element varying amounts to either side of neutral against said biasing means, means for supplying fluid pressure to said device, and reversing servo means for governing the shift of said element by said device comprising valve means including a common valve element shiftable in a direction and to an extent indicative of the desired shift of said shiftable element, and a pair of separate valve elements cooperating with said common valve element to control the flow of fluid to said device, and actuating means for said pair of elements associated with said shiftable element to impart to each of said pair of valve elements a movement proportional to the movement of said shiftable element and in a direction to cause said pair of elements to cooperate with said common element alternatively to control the supply of pressure fluid to or the exhaust of fluid from a particular end of said piston and cylinder device in accordance with the direction of shift of said common element.

3. A control mechanism comprising, in combination, a shiftable element having a neutral position, means biasing said element to neutral position, a double acting piston and cylinder device operable to shift said element varying amounts to either side of neutral against said biasing means, means for supplying fluid pressure to said device, and reversing servo means for governing the shift of said element by said device comprising valve means including a common valve element having a neutral position and shiftable from neutral position in a direction and to an extent indicative of the desired shift of said shiftable element and a pair of separate valve elements cooperating with said common valve element to control the flow of fluid to said device, and actuating means for said pair of elements associated with said shiftable element to impart to each of said pair of elements a movement proportional to the movement of said shiftable element and in such direction that one of said pair of elements cuts off the supply of fluid to one end of said device when said shiftable element has been moved to the extent predetermined by said common element while the other of said pair of elements maintains open an exhaust passage for the other end of said device.

4. A control mechanism comprising, in combination, a shiftable element having a neutral position, a reversible fluid pressure operated device operable to shift said element varying amounts to either side of neutral, means for supplying fluid pressure to said device to operate the same in a forward or a reverse direction, and servo means for governing passages for the supply and exhaust of fluid from said device to determine the direction and extent of shift of said element comprising valve means including a first valve element having a neutral position and shiftable to either side of neutral and to an extent indicative of the desired shift of said shiftable element and supplementary valve means cooperating with said first valve element and associated with said shiftable element to be moved amounts proportional to shift of said shiftable element, said servo means alternatively directing pressure fluid to said device to obtain forward or reverse operation and operating with shift of said first valve element in either direction away from neutral to open the exhaust passage more rapidly than the supply passage and operating upon shift of said supplementary valve means completely to close what had been the supply passage and to maintain widely open the exhaust passage.

5. A control mechanism comprising, in combination, a shiftable element having a neutral position, a reversible fluid pressure operated device operable to shift said element varying amounts to either side of neutral, means for supplying fluid pressure to said device to operate the same in a forward or a reverse direction, and servo means for governing the supply and exhaust of fluid from said device to determine the direction and extent of shift of said element comprising valve means including a common valve element having a neutral position and shiftable to either side of neutral and to an extent indicative of the desired shift of said shiftable element, and a pair of separate valve elements cooperating with said common valve element alternatively to control the supply or exhaust of pressure fluid to one side of said device depending upon the direction of shift of said common element and means associated with said shiftable element to have a movement proportional to the extent of shift of said element, said last mentioned means governing said pair of valve elements to cause the one controlling the supply of fluid to shift in the same direction as said common valve element as said shiftable element shifts in response to operation of said device, while the other of said pair of valve elements shifts in a direction opposite to the shift of said common valve element to increase the passage for exhaust fluid through said valve means.

6. A control mechanism comprising, in combination, a shiftable element having a neutral position, means operable to shift said element varying amounts to either side of neutral, and reversing servo means for governing the shift of said element by said last mentioned means including a first shiftable means predetermining the direction and extent of shift of said element, a second shiftable means cooperatively associated with said first shiftable means, and actuating means including manual means for said first shiftable means and automatic means for said second shiftable means including a member associated with said element to have a movement proportional to the extent of movement of said shiftable element in either direction away from neutral and in the same direction regardless of the direction of movement of said element away from neutral.

7. A control mechanism comprising, in combination, a shiftable element having a neutral position, means biasing said element to neutral position, means operable to shift said element varying amounts to either side of neutral against said biasing means, and means controlling said last mentioned means to determine the direction and extent of shift of said element comprising a member shiftable in a direction and to an extent indicative of the desired shift of said element, follow-up means associated with said member, and means for actuating the follow-up means associated with said element and driven in one direction during movement of said element in either direction away from neutral and in the opposite direction during movement of said element toward neutral from either direction.

8. A control mechanism comprising, in combination, a shiftable element having a neutral position, means operable to shift said element varying amounts to either side of neutral, and servo means for governing the shift of said element by said last mentioned means including shiftable means predetermining the direction and extent of shift of said element, a pair of shiftable parts cooperating with said shiftable means, and actuating means for said pair of shiftable parts including a member associated with said element to have a movement and proportional to the extent of movement of said element in either direction away from neutral and in the same direction regardless of the direction of movement of said element away from neutral.

9. A control mechanism comprising, in combination, a shiftable element having a neutral position, means biasing said element to neutral position, means operable to shift said element varying amounts to either side of neutral against said biasing means, and means controlling said last mentioned means to determine the direction and extent of movement of said element comprising a first member shiftable in a direction and to an extent indicative of the desired shift of said element, a pair of members associated with said first member, and means for actuating said pair of members in accordance with the movement of said element operable to shift said pair of members equal amounts in opposed directions during movement of said element in either direction away from neutral, and to shift said pair of members in an opposed but different direction during movement of said element toward neutral from either direction.

10. A control mechanism comprising, in combination, a shiftable element having a neutral position, means biasing said element to neutral position, means operable to shift said element varying amounts to either side of neutral against said biasing means, and means controlling said last mentioned means to determine the direction and extent of movement of said element comprising a first member shiftable in a direction and to an extent indicative of the desired shift of said element, a pair of members associated with said first member, and means for actuating said pair of members in accordance with the movement of said element comprising a first lever associated with said element and pivoted in one direction during movement of said element in either direction away from neutral and pivoted in another direction during movement of said reversible element toward neutral from either direction, said lever engaging one of said pair of members to shift the same, and a crank having an arm engaging the other of said pair of members and an arm projecting toward said lever, and a projection on said lever engaging said last mentioned arm to rock said crank and cause movement of the other of said pair of members equal but opposed to the movements of said one of said pair of members.

11. In combination with a shiftable element having a neutral position, fluid pressure means for shifting said element varying amounts to either side of neutral and a member associated with said element to have a movement common as to direction and proportional to the extent of movement of said element in either direction away from neutral, a reversible servo valve mechanism for controlling the fluid comprising a casing, a pair of valves movable in said casing, a valve element common to said pair of valves, said common valve element having a neutral position and being movable in either direction from neutral and to an extent indicative of the desired movement of the shiftable element, each of said pair of valves having a normal position and a position relative to said common valve element in which supply or exhaust of fluid to the fluid pressure means is blocked through that one of the pair of valves, means constantly urging said pair of valves in opposite directions away from their normal position, and means adapted to be actuated by the member associated with the shiftable element controlling said pair of valves to permit movement thereof away from their normal position during movement of the shiftable element away from its neutral position and moving said pair of valves toward their normal position with movement of the shiftable element toward its neutral position.

12. In combination with a shiftable element having a neutral position, fluid pressure means for shifting said element varying amounts to either side of neutral and a member associated with said element to have a movement common as to direction and proportional to the extent of movement of said element in either direction away from neutral, a reversible servo valve mechanism for controlling the fluid comprising a casing having a bore therein, a pair of sleeve-like valves slidable longitudinally of the bore, said valves having a normal position in abutting relationship to one another, a spool type pilot valve element common to and slidable in said sleeve valves, said common valve element having a neutral position and being movable in either direction from neutral and to an extent indicative of the desired movement of the shiftable element, each sleeve-like valve having a position relative to said common valve element in which the flow of fluid through the particular sleeve valve and the common valve element is prevented, fluid under pressure constantly urging said sleeve-like valves away from one another, and means adapted to be actuated by the member associated with the shiftable element controlling said sleeve-like valves to permit separation during movement of the shiftable element away from its neutral position and compelling return of the sleeve-like valves toward their normal abutting position with movement of the shiftable element toward its neutral position.

13. In combination with a shiftable element having a neutral position, fluid pressure means for shifting said element varying amounts to either side of neutral and a member associated with said element to have a movement common as to direction and proportional to the extent of movement of said element in either direction away from neutral, a reversible servo valve mechanism for controlling the fluid comprising a casing having a bore therein, an intermediate annular groove opening to the bore and adapted to be supplied with fluid under pressure and a pair of annular grooves opening to the bore one on either side of said intermediate groove and adapted to be connected to the fluid pressure means, a pair of sleeve-like valves slidable longitudinally in the bore and having a normal position in abutting relationship at the intermediate groove, each of said valves having a radial port at all times in registry with one of said pair of grooves and means on the abutting end providing a pressure surface against which the pressure fluid in the intermediate groove may act constantly to urge said valves apart, a spool type pilot valve common to and slidable in said sleeve-like valves, said common valve having a neutral position and being movable in either direction from neutral and to an extent indicative of the desired movement of the shiftable element and a land at each end cooperable with the radial port in one of said sleeve-like valves to prevent flow of fluid through the port, and means adapted to be actuated by the member associated with the shiftable element controlling said sleeve-like valves to permit separation during movement of the shiftable element away from its neutral position in either direction and compelling return of said sleeve-like valves to their normal abutting position with movement of the shiftable element toward its neutral position.

14. In a fluid pressure operated servo control, a reversible servo valve mechanism comprising a casing having a bore therein and an intermediate and two outward annular grooves opening to the bore, a pair of sleeve-like valves slidable in the bore having a normal position in abutting relationship to one another, each of said valves having a radial port in communication with one of said outward grooves in all positions of the valve, a spool type pilot valve element common to and slidable in said sleeve-like valves and having a pair of lands each of a width equal to the maximum longitudinal dimension of the radial port in the sleeve-like valves and spaced longitudinally to block the radial ports in both sleeve-like valves when the latter are in normal abutting relation, said spool type valve having a neutral position and being movable in either direction from neutral and to an extent indicative of the desired movement of the element to be controlled, said sleeve-like valves being constantly urged apart by the fluid being controlled, and means adapted to be associated with the element to be controlled governing the separation of said sleeve-like valves.

15. In a fluid pressure operated servo control, a reversible servo valve mechanism comprising a casing having a bore therein and an intermediate and two outward annular grooves opening to the bore, a pair of sleeve-like valves slidable in the bore having a normal position in abutting relationship to one another, each of said valves having a radial port in communication with one of said outward grooves in all positions of the valve, a spool type pilot valve element common to and slidable in said sleeve-like valves and having a pair of lands each of a width equal to the maximum longitudinal dimension of the radial port in the sleeve-like valves and spaced longitudinally to block the radial ports in both sleeve-like valves when the latter are in normal abutting relation, said spool type valve having a neutral position and being movable in either direction from neutral and to an extent indicative of the desired movement of the element to be controlled, said sleeve-like valves being constantly urged apart by the fluid being controlled, and means adapted to be associated with the element to be controlled comprising a lever pivoted intermediate its ends and having an arm for association with the element to be controlled, a bifurcated arm engaging one of said sleeve-like valves and a projection extending at right angles to said arms, a pivoted crank having a bifurcated arm engaging the other of said sleeve-like valves, and an arm engaged by said projection to be pivoted upon pivoting of said lever in a direction to move the sleeve-like valve with which it is in engagement amounts equal to and in the same relative direction with respect to said intermediate groove as the sleeve-like valve engaged by said lever.

GUNNAR A. WAHLMARK.